April 6, 1926.  
P. ROBLE  
1,579,953  
FILM HANDLING MECHANISM FOR MOTION PICTURE PROJECTING MACHINES  
Filed August 7, 1924  3 Sheets-Sheet 1
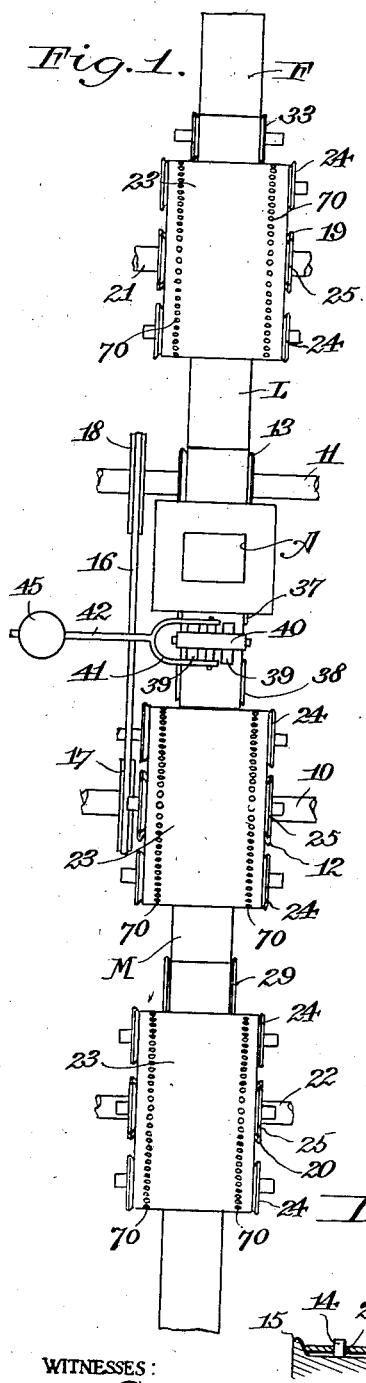
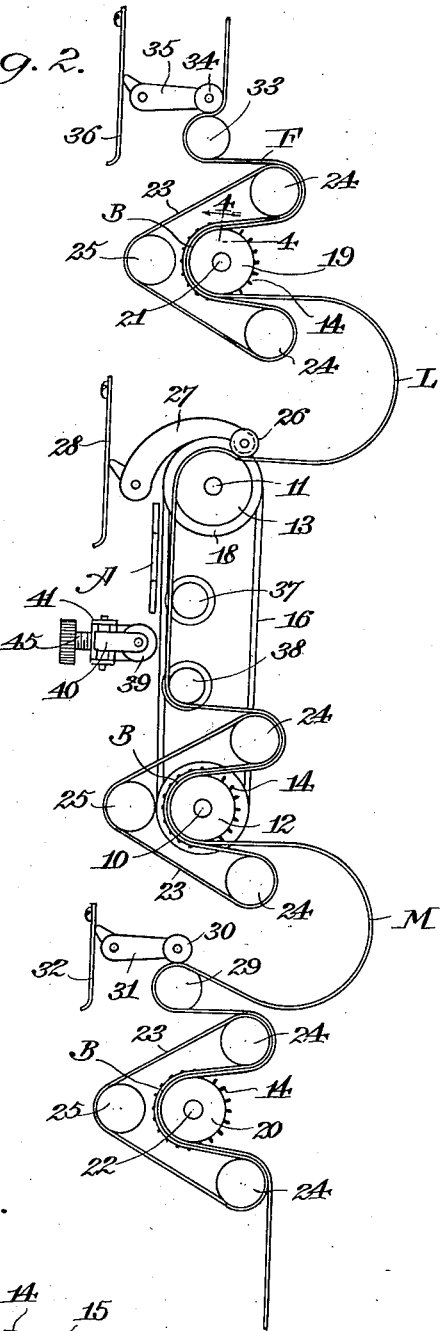
INVENTOR,  
Pedro Roble.

April 6, 1926.  
P. ROBLE  
1,579,953  
FILM HANDLING MECHANISM FOR MOTION PICTURE PROJECTING MACHINES  
Filed August 7, 1924   3 Sheets-Sheet 2
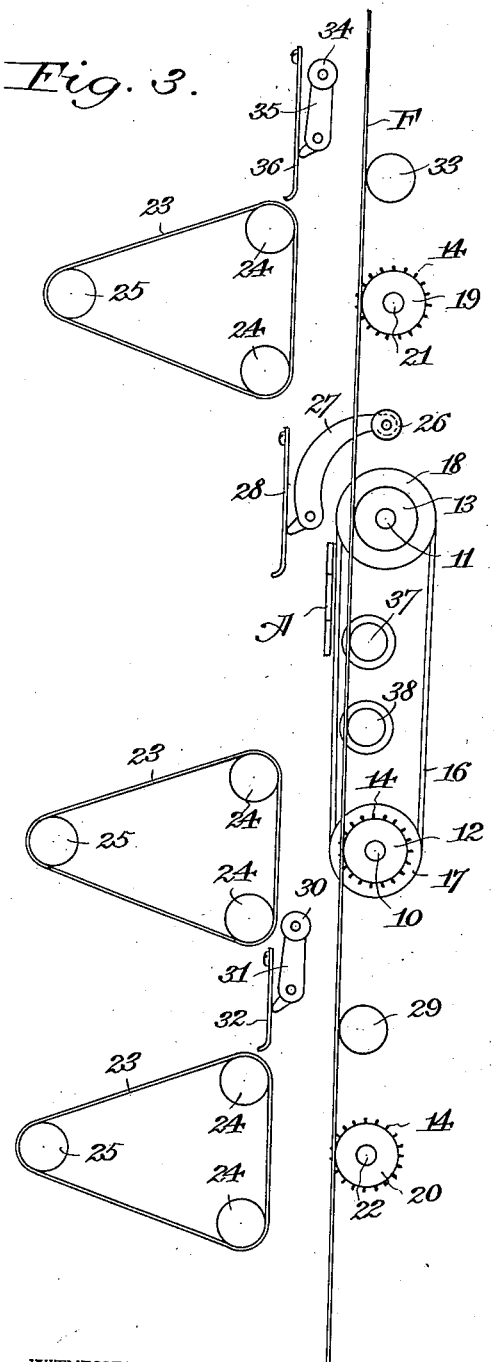
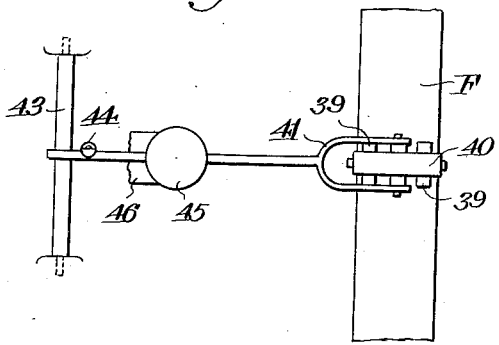
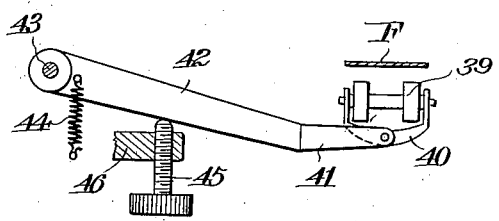
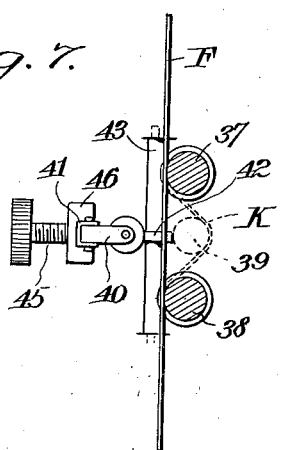
WITNESSES:
INVENTOR,
Pedro Roble.
BY
ATTORNEYS.

April 6, 1926.  
P. ROBLE  
1,579,953
FILM HANDLING MECHANISM FOR MOTION PICTURE PROJECTING MACHINES
Filed August 7, 1924   3 Sheets-Sheet 3
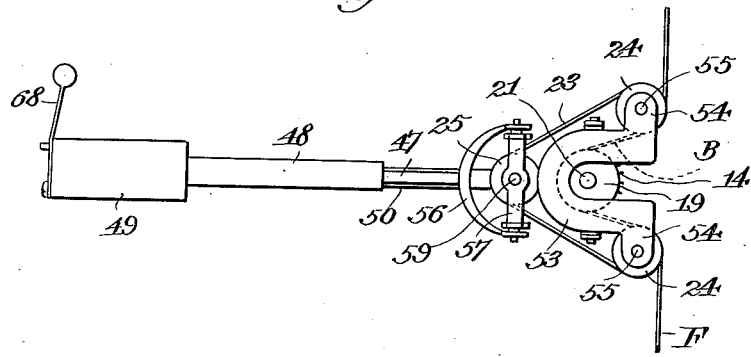
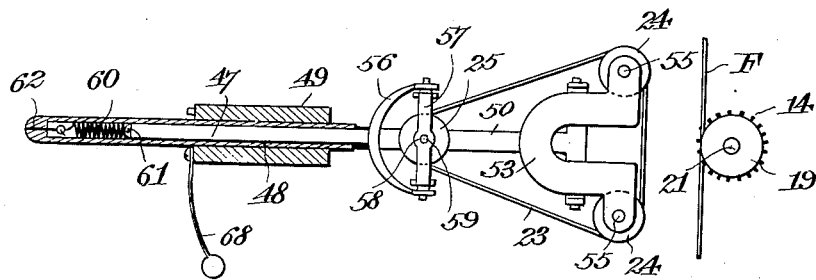
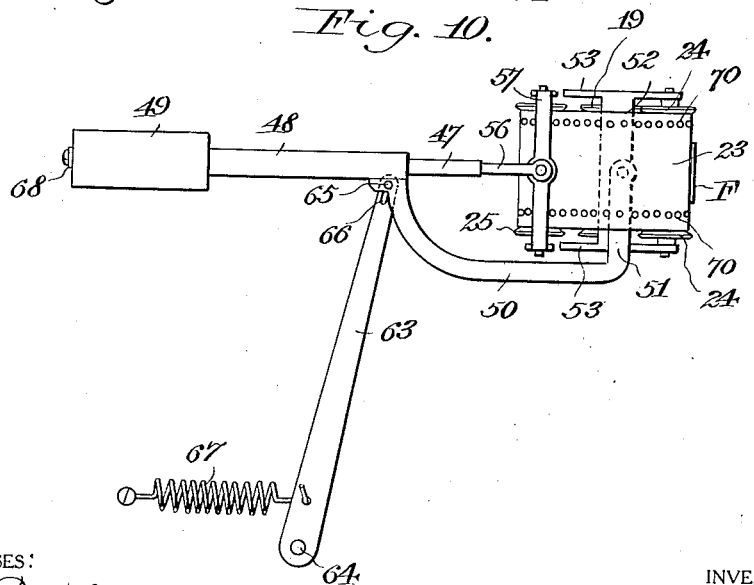
WITNESSES:
INVENTOR,
Pedro Roble.
BY
ATTORNEYS Patented Apr. 6, 1926.

1,579,953

UNITED STATES PATENT OFFICE.

PEDRO ROBLE, OF NEW YORK, N. Y., ASSIGNOR OF ONE-FOURTH TO JOAQUIN MONTOYA, OF NEW YORK, N. Y.

FILM-HANDLING MECHANISM FOR MOTION-PICTURE-PROJECTING MACHINES.

Application filed August 7, 1924. Serial No. 730,664.

*To all whom it may concern:*

Be it known that I, PEDRO ROBLE, a citizen of Colombia, and resident of the city of New York, borough of Manhattan, in the county of New York and State of New York, have invented a new and Improved Film-Handling Mechanism for Motion-Picture-Projecting Machines, of which the following is a full, clear, and exact description.

This invention has relation to motion picture machines and has particular reference to an improved mechanism for handling the film, which mechanism is especially designed for use in projecting machines.

One of the outstanding objects of the present invention, is to provide an improved film handling mechanism for motion pictures, which obviates the necessity of forming the film with feed perforations, thereby reducing the expense of manufacture of the film and eliminating the wear on the perforated portion resulting in an increase in the length of usefulness of the film.

As a further object the invention contemplates an improved film handling mechanism which facilitates and expedites the insertion and removal of the film.

Another important object of the invention resides in the provision of an improved means for controlling the registry of the film with the aperture of the machine.

The invention furthermore comprehends a film handling mechanism for motion picture projecting machines which is comparatively simple in its construction, highly efficient in its purpose and readily capable of manipulation by the operator.

With the above recited and other objects in view, the invention resides in the novel construction set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed.

In the drawings—

Figure 1 is a front view illustrating diagrammatically the improved film handling mechanism;

Fig. 2 is a side view thereof;

Fig. 3 is a side view with the mechanism shifted to a position for inserting or removing the film;

Fig. 4 is a fragmentary sectional view taken approximately on the line indicated at 4—4 in Fig. 2;

Fig. 5 is a fragmentary enlarged detail front view of the film registering means;

Fig. 6 is a fragmentary top plan view of the film registering means;

Fig. 7 is a fragmentary end view of said means;

Fig. 8 is a fragmentary enlarged detail side view of the controlling means for the film driving member, illustrating the same in active position;

Fig. 9 is a similar view of the same in its inactive position; and

Fig. 10 is a fragmentary enlarged plan view of the same.

Referring to the drawings by characters of reference 10 and 11 designate the intermittently driven shafts of the film handling mechanism to which shafts are respectively keyed the intermittent film driving roller 12 and the film tension roller 13. The intermittent roller 12 is of greater width than the film F and is provided with an outer series of sprocket teeth 14 spaced laterally from each side of the film. The outer ends of the intermittent roller 12 are further provided with peripheral flanges 15 for a purpose to be hereafter set forth. The intermittently driven shafts 10 and 11 are operatively connected by a belt 16 trained over the pulleys 17 and 18 and respectively keyed to the shafts 10 and 11. The pulley 18 is of a slightly larger diameter than the pulley 17 whereby the intermittent roller 12 is driven at a slightly greater rate of speed than the tension roller 13. Superposed and subterposed feed and take-up rollers 19 and 20 identical in construction with the intermittent roller 12 are provided each of which are of greater width than the film and each of which are provided with laterally spaced series of sprocket teeth 14 and guide flanges 15.

The feed and take-up rollers 19 and 20 are respectively keyed on the shafts 21 and 22 which are simultaneously driven continuously to move the film at the same rate of speed as the intermittent roller 12. As initially set forth the film F is not provided with perforations as is the usual film which cooperates with the teeth of drive sprockets but in lieu thereof film embracing friction driving belts 23 are designed to cooperate with the drive rollers 12, 19 and 20. The friction driving belts 23 are each trained around a pair of vertically spaced guide rollers 24 and a relatively movable rearwardly spaced guide roller 25 so that the belts when in active relation to the film form an embracing bight B which embraces and frictionally clamps portions of the film F between said bight and approximately one-half the periphery of each of the rollers 12, 19 and 20. A pressure roller 26 carried by a pivoted arm 27 is normally moved in contact by a spring 28, with the portion of the film which is trained over the tension roller 13. The usual upper and lower loops L and M are produced in the film, between the feed roller 19 and tension roller 13 and between the intermittent roller 12 and a guide roller 29. A pressure roller 30 carried by a pivoted arm 31 and normally moved by a spring 32 into contact with the portion of the film trained over the guide roller 29 is provided. In advance of the upper feed roller 19 a guide roller 33 is provided over which the film is trained and against the periphery of which the film is maintained by a pressure roller 34 carried by a pivoted arm 35 normally moved by a spring 36 into contact with the film. Between the tension roller 13 and the intermittent roller 12 the film is trained in a vertical path over a pair of vertically spaced rollers 37 and 38. Between the upper roller 37 and the guide roller 13 the film passes the aperture A through which the light rays are projected.

In order to obtain a correct registry of the film with the aperture A, a registry roller 39 is mounted for horizontal movement against the opposite face of the film from that which engages the rollers 37 and 38 so that the film may be deflected as illustrated at K in dotted lines in Fig. 7 which effects the drawing down of the film from the upper loop L. The film is drawn down due to the fact that the friction driving belt 23 which cooperates to clamp the film about the intermittent roller 12 offers a greater resistance than the resistance offered by the clamping of the film between the pressure roller 26 and the tension roller 13. It will be further noted that due to the fact that the roller 13 travels at a slightly slower rate of speed than the intermittent roller 12, the portion of the film between the tension roller 13 and intermittent drive roller 12 is tensioned to stretch the same without the use of a track or way. It will of course be appreciated that there is a slight slippage of the film between the tension roller 13 and pressure roller 26 to compensate for the variation in speed of the rollers 12 and 13.

The registry roller 39 is mounted in a yoke or fork 40 pivoted between the bifurcated end 41 of a mounting arm 42 which mounting arm is in turn pivoted as at 43 to a stationary part of the machine. A coiled contractile spring 44 constitutes the means for normally swinging the mounting arm 42 and roller to a position out of contact with the film. A set screw 45 cooperates with the arm through a bearing element 46 for advancing and maintaining the registry roller 39 in contact with the film to obtain its proper registry with the aperture A.

In order to facilitate the insertion or removal of the film with respect to the handling mechanism, the friction belts and the mounting for the guide rollers 24 and 25 thereof are movable to an out-of-the-way position as diagrammatically illustrated in Fig. 3. The mounting means for the friction belts and their guide rollers includes telescopically associated inner and outer shafts 47 and 48, the latter being axially movable through a stationary bearing 49. The outer shaft 48 which is of tubular formation is provided with an offset arm 50 having a bifurcated free end 51 within which a bearing yoke 52 is pivotally mounted. The bearing yoke 52 is provided with U-shaped ends 53 the terminals 54 of which constitute bearings for the pivots 55 of the vertically spaced guide rollers 24 for the friction driving belt 23. The inner end of the inner telescopic shaft 47 is provided with a bifurcated end 56 having a mounting element 57 pivoted therein and provided with bearing openings or journals 58 receiving the shaft 59 of the relatively movable guide roller 25 of the friction belt 23. A coiled contractile spring 60 is arranged within the outer end of the tubular shaft 48 and is respectively connected at its opposite ends with the outer end 61 of the inner shaft 47 and with the outer closed end 62 of the outer shaft 48. A lever 63 is pivoted as at 64 to a stationary part of the machine and is connected at its free end by a pin and slot 65 and 66 to the outer telescopic shaft 48. A coiled contractile spring 67 is connected with the arm 63 for normally swinging the same to a position to move the friction belts 23 and their guide rollers and mountings away from the drive rollers 12, 19 and 20 and the portion of the film which is trained thereover. A releasable catch 68 is pivoted to the outer end of the bearing 49 so that said catch when swung to the position illustrated in Fig. 9 permits the spring 67 to function to move the outer telescopic shaft 48 and the friction drive belt 23 away from the drive rollers. In its other position the catch 68 serves to prevent the movement of the shaft in this direction for intersecting the bearing opening at its outer end. It thus follows that when the shaft 48 is shifted to press the friction driving belt against the film to effect the driving of the film by the drive rollers that the bight B which engages and clamps the film against said drive rollers draws the roller 25 and the inner telescopic shaft 47 toward the guide rollers 24 so that the spring 60 is expanded and placed under tension. At the same time the drive belts 23 which are provided with perforations 70 adjacent the opposite edges are engaged and driven with the drive rollers by the sprocket teeth 14 so that the clamping engagement or gripping of the film between the drive rollers and the friction driving belts causes a positive driving action and movement of the film through the machine. The flanges 15 provided on the drive rollers 12, 19 and 20 also assist the sprocket teeth in preventing lateral displacement of the belts 23 from the drive rollers. It will thus be seen that a film without sprocket perforations can be effectually handled and moved by means of a film handling mechanism constructed in accordance with the invention.

In order to facilitate the application to or removal of film from the handling means so that the same can be inserted or removed in a straight line as illustrated in Fig. 3 the pressure rollers 26, 30 and 34 are swung to an inactive position and maintained in such position by virtue of their springs 28, 32 and 36 as clearly illustrated in Fig. 3. The catches 68 are then swung to a released position and the spring 67 swings the arm 63 which in turn shifts the shafts 48 and 47 outwardly. As the shafts are moving outwardly, the spring 60 contracts to effect a relative separation of the guide rollers 25 with respect to the guide rollers 24 of the friction belts 23 so that the bight B is straightened out or destroyed. When all of the belts 23 are moved to an out-of-the-way position it is obvious that the film may be readily positioned or removed with respect to the handling means. After a film is inserted and the upper and lower loops L and M properly formed the pressure rollers and friction driving belts 23 are reengaged with the film and the machine is ready for operation.

I claim:

1. A mechanism for handling and moving a non-perforated film strip through a moving picture machine, including feed, tension, intermittent and take-up rollers over which the film is trained, means coacting with the said feed, intermittent and take-up rollers for frictionally clamping the film therebetween and positively driving the same therewith, a pressure element engaging and clamping the film against the tension roller and means for driving the tension roller at a slower rate of speed than the intermittent roller whereby the portion of film between said intermittent and tension roller is properly tensioned.

2. A mechanism for handling and moving a non-perforated film strip through a moving picture machine, including feed, tension, intermittent and take-up rollers over which the film is trained, means coacting with the said feed, intermittent and take-up rollers for frictionally clamping the film therebetween and positively driving the same therewith, a pressure element engaging and clamping the film against the tension roller and means for driving the tension roller from the intermittent roller at a slower rate of speed than the intermittent roller whereby the portion of film between said intermittent and tension roller is properly tensioned.

3. A mechanism for handling and moving a non-perforated film strip through a moving picture machine, including feed, tension, intermittent and take-up rollers, over which the film is trained, and means coacting with the said feed, intermittent and take-up rollers for frictionally clamping the film therebetween and positively driving the same therewith and mounting devices for each of said means to permit of relative separation of the means from the rollers to facilitate the insertion or removal of the film from the handling mechanism, said means comprising endless friction driving belts, each of which respectively embraces the film at the points where said film is trained over the feed, intermittent and take-up rollers said belts being of greater width than the film and having a series of sprocket perforations adjacent their opposite side edges, and a series of sprocket teeth formed on the feed, intermittent and take-up rollers adjacent their opposite ends and to one side of the side edges of the film, for engaging the sprocket perforations of the belts to positively drive the same therewith.

4. A mechanism for handling and moving a non-perforated film strip through a moving picture machine, including feed, tension, intermittent and take-up rollers over which the film is trained, and means coacting with the said feed, intermittent and take-up rollers for frictionally clamping the film therebetween and positively driving the same therewith and mounting devices for each of said means to permit of relative separation of the means from the rollers to facilitate the insertion or removal of the film from the handling mechanism said mounting devices each comprising a pair of relatively immovable guide rollers adapted to straddle the feed, intermittent or take-up rollers and a relatively movable tension guide roller over which roller the endless friction belts are trained, a supporting element for the first pair of guide rollers and a supporting element for the tensioned guide roller connected with said first supporting element for relative movement with respect thereto.

5. A mechanism for handling and moving a non-perforated film strip through a moving picture machine, including feed, tension, intermittent and take-up rollers over which the film is trained, and means coacting with the said feed, intermittent and take-up rollers for frictionally clamping the film therebetween and positively driving the same therewith and mounting devices for each of said means to permit of relative separation of the means from the rollers to facilitate the insertion or removal of the film from the handling mechanism said mounting devices each comprising a pair of relatively immovable guide rollers adapted to straddle the feed, intermittent or take-up rollers and a relatively movable tension guide roller over which roller the endless friction belts are trained, a supporting element for the first pair of guide rollers and a supporting element for the tensioned guide roller connected with said first supporting element for relative movement with respect thereto, the lead of said belts which extends between the first mentioned pair of guide rollers, adapted to form a bight which engages and embraces the film at the points where said film is trained over the feed, intermittent and take-up rollers.

6. A mechanism for handling and moving a non-perforated film strip through a moving picture machine, including feed, tension, intermittent and take-up rollers over which the film is trained, and means coacting with the said feed, intermittent and take-up rollers for frictionally clamping the film therebetween and positively driving the same therewith and mounting devices for each of said means to permit of relative separation of the means from the rollers to facilitate the insertion or removal of the film from the handling mechanism said mounting devices each comprising a pair of relatively immovable guide rollers adapted to straddle the feed, intermittent or take-up rollers and a relatively movable tension guide roller over which roller the endless friction belts are trained, a supporting element for the first pair of guide rollers and a supporting element for the tensioned guide roller connected with said first supporting element for relative movement with respect thereto, the lead of said belts which extends between the first mentioned pair of guide rollers, adapted to form a bight which engages and embraces the film at the points where said film is trained over the feed, intermittent and take-up rollers and a common bearing through which the supporting elements for the rollers of each belt is shiftable.

7. A mechanism for handling and moving a nonperforated film strip through a moving picture machine, including feed, tension, intermittent and take-up rollers over which the film is trained, and means coacting with the said feed, intermittent and take-up rollers for frictionally clamping the film therebetween and positively driving the same therewith and mounting devices for each of said means to permit of relative separation of the means from the rollers to facilitate the insertion or removal of the film from the handling mechanism said mounting devices each comprising a pair of relatively immovable guide rollers adapted to straddle the feed, intermittent or take-up rollers and a relatively movable tension guide roller over which roller the endless friction belts are trained, a supporting element for the first pair of guide rollers and a supporting element for the tensioned guide roller connected with said first supporting element for relative movement with respect thereto, the lead of said belts which extends between the first mentioned pair of guide rollers, adapted to form a bight which engages and embraces the film at the points where said film is trained over the feed, intermittent and take-up rollers, a common bearing through which the supporting elements for the rollers of each belt is shiftable and means for normally shifting said elements to move the belts to an inactive position with respect to the rollers.

8. A mechanism for handling and moving a non-perforated film strip through a moving picture machine, including feed, tension, intermittent and take-up rollers over which the film is trained, and means coacting with the said feed, intermittent and take-up rollers for frictionally clamping the film therebetween and positively driving the same therewith and mounting devices for each of said means to permit of relative separation of the means from the rollers to facilitate the insertion or removal of the film from the handling mechanism, said mounting devices each comprising a pair of relatively immovable guide rollers adapted to straddle the feed, intermittent or take-up rollers and a relatively movable tension guide roller over which roller the endless friction belts are trained, a supporting element for the first pair of guide rollers and a supporting element for the tensioned guide roller connected with said first supporting element for relative movement with respect thereto, the lead of said belts which extends between the first mentioned pair of guide rollers, adapted to form a bight which engages and embraces the film at the points where said film is trained over the feed, intermittent and take-up rollers, a common bearing through which the supporting elements for the rollers of each belt is shiftable, means for normally shifting said elements to move the belts to an inactive position with respect to the rollers and means for holding said elements in a position to maintain the belts in active relation to the rollers.

9. A mechanism for handling and moving a non-perforated film strip through a moving picture machine, including feed, tension, intermittent and take-up rollers over which the film is trained, means coacting with the said feed, intermittent and take-up rollers for frictionally clamping the film therebetween and positively driving the same therewith and means interposed between the tension and intermittent rollers for producing a lateral localized kink or deflection of the film to obtain the proper registry of the same with the aperture, said latter means comprising a pair of stationary spaced parallel rollers disposed at one side of the film and a relatively movable roller disposed at the opposite side of the film and means for moving said latter roller between the former rollers.

PEDRO ROBLE.